(12) United States Patent
Karjala et al.

(10) Patent No.: US 10,316,115 B2
(45) Date of Patent: Jun. 11, 2019

(54) PROCESS TO VISBREAK PROPYLENE-BASED POLYMERS WITH C—C INITIATORS

(71) Applicant: Dow Global Technologies LLC, Midland, MI (US)

(72) Inventors: Teresa P. Karjala, Lake Jackson, TX (US); Sean W. Ewart, Pearland, TX (US); Mehmet Demirors, Pearland, TX (US); Michael W. Tilston, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 64 days.

(21) Appl. No.: 15/100,510

(22) PCT Filed: Dec. 17, 2014

(86) PCT No.: PCT/US2014/070846
§ 371 (c)(1),
(2) Date: May 31, 2016

(87) PCT Pub. No.: WO2015/095320
PCT Pub. Date: Jun. 25, 2015

(65) Prior Publication Data
US 2016/0297898 A1    Oct. 13, 2016

Related U.S. Application Data

(60) Provisional application No. 61/918,326, filed on Dec. 19, 2013.

(51) Int. Cl.
*C08F 8/50* (2006.01)
*C08L 23/10* (2006.01)

(52) U.S. Cl.
CPC ............... *C08F 8/50* (2013.01); *C08L 23/10* (2013.01)

(58) Field of Classification Search
CPC ................................... C08F 8/50; C08L 23/10
USPC ...................................................... 524/582
See application file for complete search history.

(56) References Cited

U.S. PATENT DOCUMENTS

| | | |
|---|---|---|
| 3,013,003 A | 12/1961 | Maragliano et al. |
| 3,144,436 A | 8/1964 | Greene et al. |
| 3,287,342 A | 11/1966 | Walton |
| 3,349,018 A | 10/1967 | Potts |
| 3,563,972 A | 2/1971 | Kowalski |
| 3,940,379 A | 2/1976 | Castagna et al. |
| 4,061,694 A | 12/1977 | Castagna |
| 4,087,485 A | 5/1978 | Huff |
| 4,087,486 A | 5/1978 | Fielding et al. |
| 4,282,076 A | 8/1981 | Boynton |
| 4,552,930 A | 11/1985 | Hirota et al. |
| 4,626,565 A | 12/1986 | Kawai et al. |
| 4,707,524 A | 11/1987 | Ehrig et al. |
| 5,066,723 A | 11/1991 | Randall, Jr. et al. |
| 5,268,440 A | 12/1993 | Luft et al. |
| 5,587,434 A | 12/1996 | McCullough, Jr. et al. |
| 6,967,229 B2 | 11/2005 | Voorheis |
| 2004/0159972 A1 | 8/2004 | Koschmieder et al. |
| 2006/0047049 A1 | 3/2006 | Onishi et al. |
| 2010/0108357 A1 | 5/2010 | Smedberg et al. |
| 2012/0123374 A1 | 5/2012 | Richeson |

FOREIGN PATENT DOCUMENTS

| | | |
|---|---|---|
| BR | 9904066 | 4/2001 |
| EP | 0063654 A1 | 11/1982 |
| EP | 0351208 A2 | 1/1990 |
| EP | 1944327 A1 | 7/2008 |
| JP | 06275129 A * | 9/1994 |
| WO | 2012/074812 A1 | 6/2012 |
| WO | 2012/096962 A1 | 7/2012 |

OTHER PUBLICATIONS

E.P. Otocka, et al., Macromolecules, vol. 4, No. 4, Jul.-Aug. 1971, pp. 507-514.
Th.G. Scholte, et al., J. Appl. Polym. Sci., vol. 29, 1984, pp. 3763-3782.

* cited by examiner

*Primary Examiner* — Kelechi C Egwim
(74) *Attorney, Agent, or Firm* — Husch Blackwell LLP

(57) ABSTRACT

The invention provides a process to prepare a second propylene-based polymer from a first propylene-based polymer, each propylene-based polymer having a melt flow rate (MFR; 2.16 kg/230° C.) with the MFR of the second propylene-based polymer greater than the MFR of the first propylene-based polymer, the process comprising the step of contacting under visbreaking conditions the first propylene-based polymer with at least one carbon-carbon (C—C) free-radical initiator of Structure (I): (Structure (I)) wherein $R_1$, $R_2$, $R_3$, $R_4$, $R_5$ and $R_6$ are each, independently, a hydrocarbyl group or a substituted hydrocarbyl group, and wherein, optionally, two or more R groups ($R_1$, $R_2$, $R_3$, $R_4$, $R_5$ and $R_6$) form a ring structure.

14 Claims, 1 Drawing Sheet

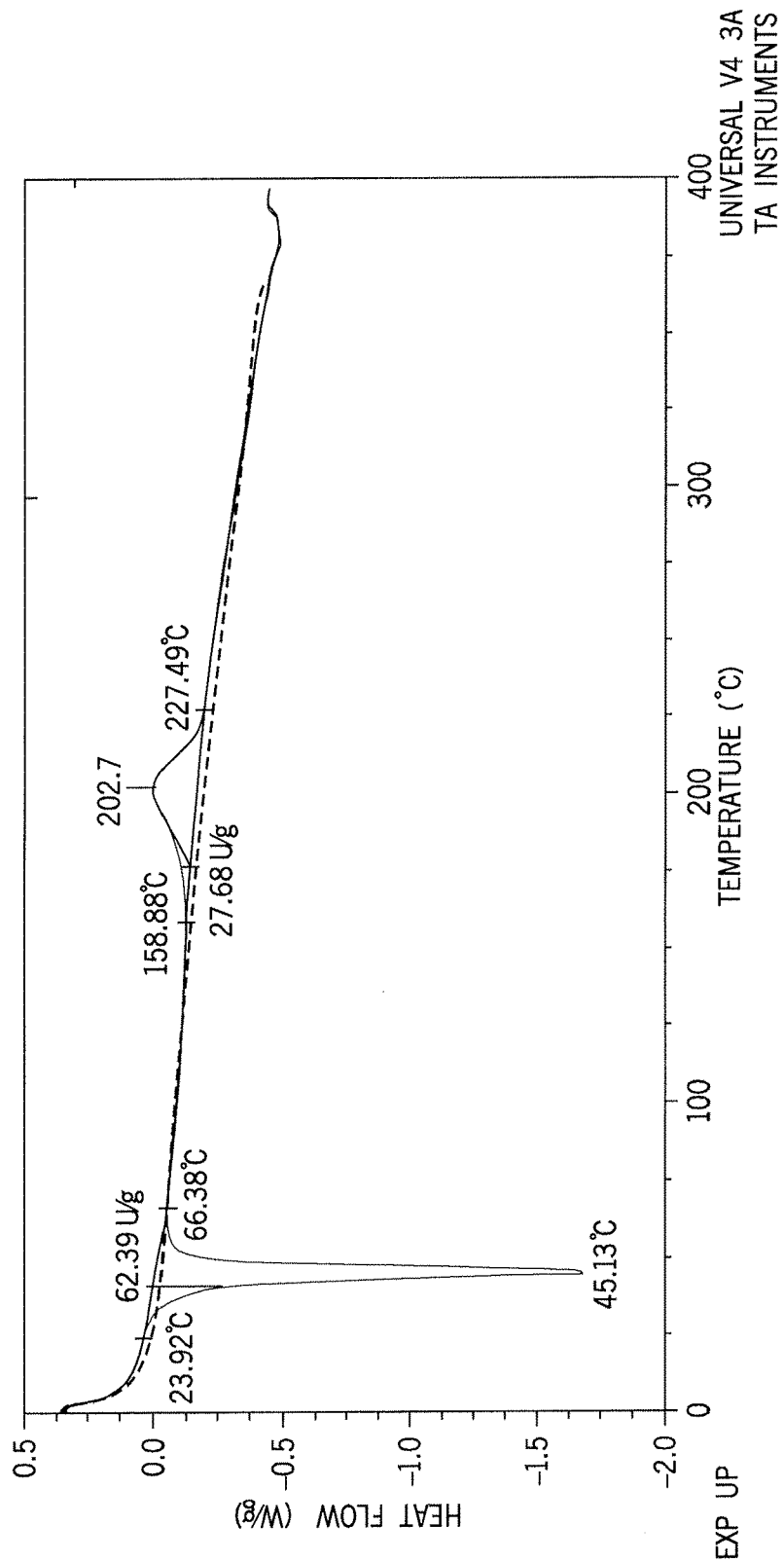

PROCESS TO VISBREAK PROPYLENE-BASED POLYMERS WITH C—C INITIATORS

CROSS REFERENCE TO RELATED APPLICATION

This application claims priority to U.S. patent application no. 61/918,326 filed on Dec. 19, 2013, the entire content of which is incorporated by reference herein.

BACKGROUND OF THE INVENTION

The conventional way of visbreaking polypropylene (PP) is by use of organic peroxides. While organic peroxides increase the melt flow rate (MFR) of the resin, the byproducts which are generated (typically alcohols, ketones, aldehydes, etc.) impart strong taste and odor to the resultant product. The carbon-carbon (C—C) initiators do not have any oxygen in their structures and as such do not generate those objectionable taste and odor components.

WO 2012/096962 discloses the use of "C-C containing" compounds as antioxidants. WO 2012/074812 discloses the use of a "C-C containing" compound as an impurity scavenger in the polymerization of block copolymers. WO 2010/0108357 discloses the use of a "C—C containing" compound as a crosslinking agent in a polymer composition. U.S. Pat. No. 5,268,440 discloses the use of a C—C initiator in an LDPE process. U.S. Pat. No. 6,967,229 discloses the use of "C—C containing" compounds in the formation of golf ball components. US 2006/0047049 discloses "C—C containing" compounds in flame retardant compositions. There remains a need for new processes to form visbroken propylene-based polymers with improved properties. This need has been met by the following invention.

SUMMARY OF THE INVENTION

The invention provides a process to prepare a second propylene-based polymer from a first propylene-based polymer, each propylene-based polymer having a melt flow rate (MFR; 2.16 kg/230° C.) with the MFR of the second propylene-based polymer greater than the MFR of the first propylene-based polymer, the process comprising the step of contacting under visbreaking conditions the first propylene-based polymer with at least one carbon-carbon (C—C) free-radical initiator of Structure I:

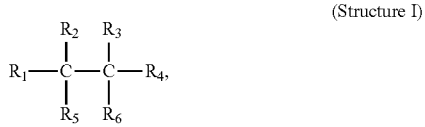

(Structure I)

wherein $R_1$, $R_2$, $R_3$, $R_4$, $R_5$ and $R_6$ are each, independently, a hydrocarbyl group or a substituted hydrocarbyl group, and wherein, optionally, two or more R groups ($R_1$, $R_2$, $R_3$, $R_4$, $R_5$ and $R_6$) form a ring structure.

BRIEF DESCRIPTION OF THE DRAWINGS

FIG. 1 is a DSC profile of DEDPH, showing melting peak at 45.1° C. and decomposition peak at 202.7° C.

DETAILED DESCRIPTION OF THE PREFERRED EMBODIMENT

The invention provides a process to prepare a second propylene-based polymer from a first propylene-based polymer, each propylene-based polymer having a melt flow rate (MFR; 2.16 kg/230° C.) with the MFR of the second propylene-based polymer greater than the MFR of the first propylene-based polymer, the process comprising the step of contacting under visbreaking conditions the first propylene-based polymer with at least one carbon-carbon (C—C) free-radical initiator of Structure I:

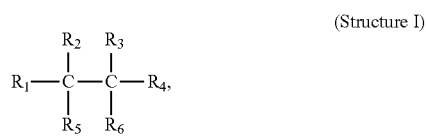

(Structure I)

wherein $R_1$, $R_2$, $R_3$, $R_4$, $R_5$ and $R_6$ are each, independently, a hydrocarbyl group or a substituted hydrocarbyl group, and wherein, optionally, two or more R groups ($R_1$, $R_2$, $R_3$, $R_4$, $R_5$ and $R_6$) form a ring structure.

An inventive process may comprise a combination of two or more embodiments as described herein.

In one embodiment, the C-C free-radical initiator is present in an amount greater than, or equal to, 0.12 grams per kilogram (g/kg), further greater than 0.20 grams per kilogram, further greater than 0.50 grams per kilogram, further greater than 0.70 grams per kilogram, of the first propylene-based polymer.

In one embodiment, the C-C free-radical initiator is present in an amount greater than, or equal to, 1.00 grams per kilogram (g/kg), further greater than 1.20 grams per kilogram, further greater than 1.50 grams per kilogram, of the first propylene-based polymer.

In one embodiment, the C-C free-radical initiator has a decomposition temperature of greater than (>) or equal to 125° C., or >130° C., or >150° C., or >180° C., or >200° C., or >250° C., or >300° C., based on DSC measurements.

In one embodiment, the process comprises decomposing or activating the C—C free radical initiator by radiation.

In one embodiment, the process comprises contacting the first propylene-based polymer with at least two C—C free-radical initiators.

In one embodiment, for Structure I, $R_1$ and $R_4$ are phenyl.

In one embodiment, for Structure I, the at least one C—C initiator is selected from the group consisting of 2,3-dimethyl-2,3-diphenyl butane; 3,4-dimethyl-3,4-diphenyl hexane; and 3,4-diethyl-3,4-diphenyl hexane.

In one embodiment, the MFR of the second propylene-based polymer is less than or equal to (≤), 200 g/10 min, further ≤150 g/10 min, further ≤100 g/10 min, further ≤90 g/10 min.

In one embodiment, the MFR of the second propylene-based polymer is greater than or equal to (≥) 10 g/10 min, further ≥20 g/10 min, further ≥50 g/10 min, but ≤90 g/10 min.

In one embodiment, the MFR of the second propylene-based polymer is ≥100 g/10 min, further ≥200 g/10 min, further ≥500 g/10 min, further ≥1000 g/10 min.

In one embodiment, the MFR of the second propylene-based polymer is at least 130%, or at least 150%, or at least 200%, or at least 300%, or at least 400% of the MFR of the first propylene based polymer.

In one embodiment, the first propylene-based polymer is contacted with at least one carbon-carbon (C—C) free-radical initiator of Structure I, and at least one peroxide.

In one embodiment, the molar ratio of the carbon-carbon free radical initiator to the peroxide is greater than 1.0, further greater than 1.5, further greater than 2.0.

An inventive process may comprise a combination of two or more embodiments as described herein.

The invention also provides a composition comprising the second propylene-based polymer formed by the process of any one of the previous claims.

In one embodiment, the second propylene-based polymer has a tert butanol level ≤1.0 ppm, or ≤0.9 ppm, or ≤0.8 ppm.

In one embodiment, the second propylene-based polymer has a density ≤0.90 g/cc, further ≤0.89 g/cc, and further ≤0.88 g/cc.

In one embodiment, the second propylene-based polymer has a density ≤0.83 g/cc, further ≤0.84 g/cc, and further ≤0.85 g/cc.

In one embodiment, the second propylene-based polymer has a density from 0.83 g/cc, to 0.90 g/cc, further from 0.84 g/cc to 0.89 g/cc, and further from 0.85 g/cc to 0.88 g/cc.

In one embodiment, the second propylene-based polymer has a density ≤0.946 g/cc, further ≤0.93 g/cc, and further ≤0.91 g/cc.

In one embodiment, the second propylene-based polymer has a density from 0.83 g/cc to 0.946 g/cc, further from 0.88 g/cc to 0.93 g/cc, and further from 0.89 g/cc to 0.91 g/cc.

In one embodiment, the second propylene-based polymer has a molecular weight distribution from 1.5 to 6, further from 2.5 to 5.5, and further from 3 to 5.

In one embodiment, the composition further comprises one or more additives.

An inventive composition may comprise a combination of two or more embodiments as described herein.

The invention also provides an article comprising at least one component formed from an inventive composition as described herein. In a further embodiment, the article is a film or a coating.

An inventive article may comprise a combination of two or more embodiments as described herein.

The second propylene-based polymer may comprise a combination of two or more embodiments as described herein.

The first propylene-based polymer may comprise a combination of two or more embodiments as described herein.

C—C Initiators

The carbon-carbon ("C—C") initiators used in the practice of this invention have Structure I:

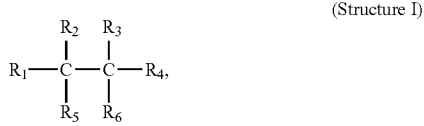

(Structure I)

wherein $R_1$-$R_6$ are each, independently, a hydrocarbyl or a substituted hydrocarbyl group, and wherein optionally two or more $R_1$-$R_6$ groups may form a ring structure.

In one embodiment, one or more of the $R_1$-$R_6$ groups are aliphatic.

In one embodiment, one or more of the $R_1$-$R_6$ groups are alkyl.

In one embodiment, one or more of the $R_1$-$R_6$ groups are aryl.

In one embodiment, the $R_1$-$R_6$ are each, independently, an hydrocarbyl group, and wherein optionally two or more $R_1$-$R_6$ groups may form a ring structure.

In one embodiment, the $R_1$-$R_6$ are each, independently, a hydrocarbyl or a substituted hydrocarbyl group.

In one embodiment, the $R_1$-$R_6$ are each, independently, a substituted hydrocarbyl group, and wherein optionally two or more $R_1$-$R_6$ groups may form a ring structure.

In one embodiment, the $R_1$-$R_6$ are each, independently, a $C_{1-24}$ hydrocarbyl or a $C_{1-24}$ substituted hydrocarbyl group, and wherein optionally two or more $R_1$-$R_6$ groups may form a ring structure.

In one embodiment, the $R_1$-$R_6$ are each, independently, a $C_{1-24}$ hydrocarbyl group, and wherein optionally two or more $R_1$-$R_6$ groups may form a ring structure.

In one embodiment, the $R_1$-$R_6$ groups are each, independently, a $C_{1-24}$ hydrocarbyl or a $C_{1-24}$ substituted hydrocarbyl group.

In one embodiment, the $R_1$-$R_6$ groups are each, independently, a $C_{1-24}$ substituted hydrocarbyl group, and wherein optionally two or more $R_1$-$R_6$ may form a ring structure.

In one embodiment, the $R_1$-$R_6$ groups are each, independently a $C_{1-12}$ hydrocarbyl or a $C_{1-12}$ substituted hydrocarbyl group, and wherein optionally two or more $R_1$-$R_6$ groups may form a ring structure.

In one embodiment, the $R_1$-$R_6$ groups are each, independently, a $C_{1-12}$ hydrocarbyl group, and wherein optionally two or more $R_1$-$R_6$ groups may form a ring structure.

In one embodiment, the $R_1$-$R_6$ are each, independently, a $C_{1-12}$ hydrocarbyl or $C_{1-12}$ substituted hydrocarbyl group.

In one embodiment, the $R_1$-$R_6$ groups are each, independently, a $C_{1-12}$ substituted hydrocarbyl group, and wherein optionally two or more $R_1$-$R_6$ groups may form a ring structure.

In one embodiment, the $R_1$-$R_6$ are each, independently a $C_{1-6}$ hydrocarbyl or a $C_{1-6}$ substituted hydrocarbyl group, and wherein optionally two or more $R_1$-$R_6$ groups may form a ring structure.

In one embodiment, the $R_1$-$R_6$ groups are each, independently, a $C_{1-6}$ hydrocarbyl group, and wherein optionally two or more $R_1$-$R_6$ groups may form a ring structure.

In one embodiment, the $R_1$-$R_6$ groups are each, independently, a $C_{1-6}$ hydrocarbyl or $C_{1-6}$ substituted hydrocarbyl group.

In one embodiment, the $R_1$-$R_6$ groups are each, independently, a $C_{1-6}$ substituted hydrocarbyl group, and wherein optionally two or more $R_1$-$R_6$ may form a ring structure.

In one embodiment $R_1$ and $R_4$ are the same or different aryl radicals. In a further embodiment, $R_1$ and $R_4$ are each phenyl, e.g., Structure II; and wherein $R_2$, $R_3$, $R_5$ and $R_6$ are each as described above:

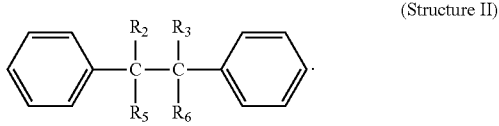

(Structure II)

In one embodiment, $R_2$-$R_3$ and $R_5$-$R_6$ are the same or different alkyl radicals, more preferably the same or different $C_{1-6}$ alkyl radicals, and even more preferably the same $C_{14}$ straight chain alkyl radical.

Representative C-C initiators include, but are not limited to, the following Structures as follows: 2,3-dimethyl-2,3-diphenyl butane (Structure III)

(Structure III)

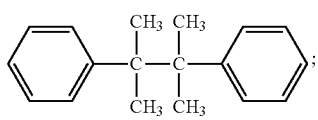

3,4-dimethyl-3,4-diphenyl hexane (Structure IV)

(Structure IV)

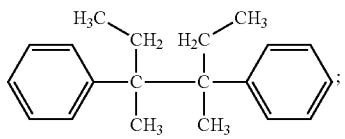

and, 3,4-diethyl-3,4-diphenyl hexane (Structure V)

(Structure V)

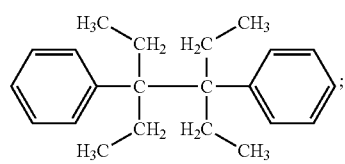

2,7-dimethyl-4,5-diethyl-4,5-diphenyl octane (DBuDPH) (Structure VI)

(Structure VI)

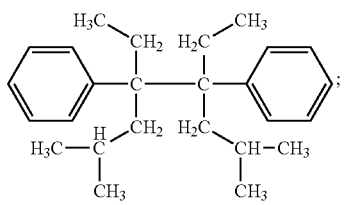

3,4-dibenzyl-3,4-ditolyl hexane (DBnDTH) (Structure VII)

Structure VII

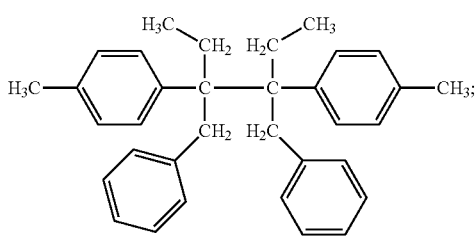

3,4-diethyl-3,4-di(dimethylphenyl) hexane (Structure VIII)

Structure VIII

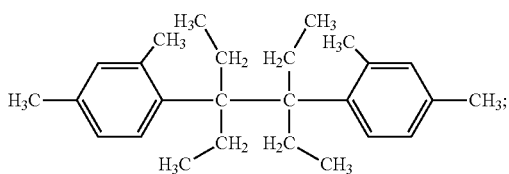

and, 3,4-dibenzyl-3,4-diphenyl hexane (Structure IX)

Structure IX

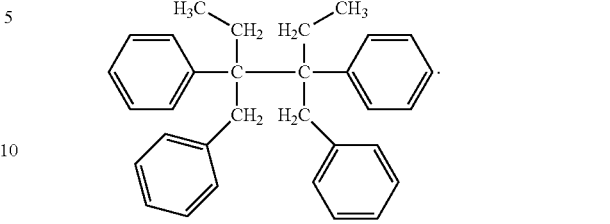

Other C—C initiators include poly-1,4-diisopropyl benzene, 1,1,2,2-tetraphenyl-1,2-ethane diol, and those of Structure 1 and described in such publications as WO 2012/096962, WO 2012/074812, US 2010/0108357, EP 1 944 327, U.S. Pat. No. 5,268,440, U.S. Pat. No. 6,967,229 and US 2006/0047049. The C—C initiators can be used alone or in combination with one another.

In one embodiment, the amount of C—C initiator used in the practice of this invention is typically at least 0.05 wt %, more typically at least 0.10 wt %, and even more typically at least 0.20 wt % based on the weight of the first propylene-based polymer. While the only limitation on the maximum amount of C—C initiator used in the practice of this invention is a function of process economics and efficiency, typically the maximum amount of C-C initiator used in the practice of this invention does not exceed 1 wt %, more typically does not exceed 0.8 wt % and even more typically does not exceed 0.5 wt %, based on the weight of the first propylene-based polymer.

A C—C initiator may comprise a combination of two or more embodiments as described herein.

First Propylene-Based Polymer

The propylene-based polymers used as the "first propylene-based polymer" include both propylene homopolymers and propylene interpolymers and copolymers.

In one embodiment, the first propylene-based polymer is a propylene copolymer. In a further embodiment, the first propylene copolymer comprises more than 50 wt % units derived from propylene, typically more than 60 wt % and more typically more than 70 wt %, units derived from propylene with the remainder of the polymer comprising units of one or more comonomers, typically an alpha-olefin monomer such as ethylene, butene, pentene, hexene, octene and the like. First propylene copolymers can also include units derived from diener such as butadiene, isoprene, cyclopentadiene and the like.

In one embodiment the propylene-based polymers before visbreaking, i.e., the first propylene-based polymer, contain little (e.g., less than (<) 1 wt %, or <0.5 wt %, or <0.1 wt %), if any, peroxide or oxygen.

The propylene-based polymers before visbreaking, i.e., the first propylene-based polymer, typically have a melt flow rate (MFR) of less than or equal to ($\leq$) 50 grams per 10 minute (g/10 min), more typically $\leq 25$, or $\leq 20$, or $\leq 10$, or $\leq 5$, or $\leq 1$, or $\leq 0.5$, or $\leq 0.1$, g/10 min.

The propylene-based polymers after visbreaking, i.e., the second propylene-based polymer, typically have a MFR more than 130%, typically more than (>) 150%, or >200%, or >300%, of their MFR before visbreaking. In one embodiment the second propylene-based polymer typically has an MFR greater than or equal to ($\geq$) 0.13, or $\geq 0.15$, or $\geq 0.2$, or $\geq 0.3$, or $\geq 0.5$, or $\geq 1$, or $\geq 5$, $\geq 10$, or $\geq 20$, or $\geq 30$, or $\geq 40$, or $\geq 50$, or $\geq 60$, or $\geq 70$, or $\geq 80$, or $\geq 90$, or $\geq 100$, or $\geq 200$, or ≥300, g/10 min. In one embodiment the second propylene-based polymer has a MFR from 0.13 to 300, or from 0.13 to 200, or from 0.13 to 100, or from 0.13 to 50, or from 0.13 to 20, or from 0.13 to 10, g/10 min.

Suitable first propylene-based polymers include propylene homopolymers and propylene interpolymers. The polypropylene homopolymer can be isotactic, syndiotactic or atactic polypropylene. The propylene interpolymer can be a random or block copolymer, or a propylene-based terpolymer. Reactor copolymers of polypropylene may also be used.

Suitable comonomers for polymerizing with propylene include ethylene, 1-butene, 1-pentene, 1-hexene, 1-heptene, 1-octene, 1-nonene, 1-decene, 1-undecene, 1-dodecene, as well as 4-methyl-1-pentene, 4-methyl-1-hexene, 5-methyl-1-hexene, vinylcyclohexane, and styrene. The preferred comonomers include ethylene, 1-butene, 1-hexene, and 1-octene, and more preferably ethylene.

Suitable first propylene-based polymers include Dow 5D98 and other polypropylene homopolymers and copolymers (now available from Braskem); VERSIFY plastomers and elastomers (The Dow Chemical Company) and VISTAMAXX polymers (ExxonMobil Chemical Co.), LICOCENE polymers (Clariant), EASTOFLEX polymers (Eastman Chemical Co.), REXTAC polymers (Hunstman), VESTOPLAST polymers (Degussa), PROFAX PF-611 and PROFAX PF-814 (Montell).

In one embodiment, the first propylene-based polymer has a density less than, or equal to (≤), 0.90 g/cc, preferably ≤0.89 g/cc, and more preferably ≤0.88 g/cc.

In one embodiment, the first propylene-based polymer has a density greater than or equal to (≥) 0.83 g/cc, preferably ≥0.84 g/cc, and more preferably ≥0.85 g/cc.

In one embodiment, the first propylene-based polymer has a density from 0.83 g/cc to 0.90 g/cc, and preferably from 0.84 g/cc to 0.89 g/cc, and more preferably from 0.85 g/cc to 0.88 g/cc.

In one embodiment, the first propylene-based polymer has a molecular weight distribution from 1.5 to 6, and more preferably from 2.5 to 5.5, and more preferably from 3 to 5.

The first propylene-based polymer may have a combination of two or more suitable embodiments as described herein.

Visbreaking Process

The visbreaking process of this invention comprises the step of contacting a first propylene-based polymer with a C-C free radical initiator under visbreaking conditions, preferably in the absence of oxygen and typically under an inert atmosphere, e.g., nitrogen. Visbreaking conditions typically include a temperature at which the first propylene-based polymer is molten and the C-C free radical initiator will decompose to form free radicals, e.g., from 200° C. to 350° C., or from 200° C. to 300° C., or from 210° C. to 270° C. In one embodiment the visbreaking conditions include decomposing or activating the C-C free radical initiator by exposing the same to radiation.

The contacting is typically performed in conventional mixing apparatus, e.g., mixing extruder, batch mixer, etc., and continues until the MFR of the first propylene-based polymer is increased to the desired level. The C—C initiator can be added to the polymer at one time, or metered into the polymer over time. Additives, e.g., stabilizers, can be present in the polymer during the mixing operation.

Additives

An inventive composition may comprise one or more additives. Additives include, but are not limited to, stabilizers, antistatic agents, pigments, dyes, nucleating agents, fillers, slip agents, fire retardants, plasticizers, processing aids, lubricants, stabilizers, smoke inhibitors, viscosity control agents, anti-blocking agents, and combinations thereof.

Typically, the inventive compositions contain one or more stabilizers, for example, antioxidants, such as IRGANOX 1010 and IRGAFOS 168, both supplied by Ciba Specialty Chemicals. Polymers are typically treated with one or more stabilizers before an extrusion or other melt processes.

DEFINITIONS

Unless stated to the contrary, implicit from the context, or customary in the art, all parts and percents are based on weight, and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

"Comprising", "including", "having" and like terms mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc., excepting those that are not essential to the performance, operability or the like of the composition, process, etc. The term "consisting of" excludes from a composition, process, etc., any component, step, etc., not specifically disclosed. The term "or", unless stated otherwise, refers to the disclosed members individually as well as in any combination.

The term "polymer," as used herein, refers to a polymeric compound prepared by polymerizing monomers, whether of the same or a different type. The generic term polymer thus embraces the term homopolymer (employed to refer to polymers prepared from only one type of monomer), and the term interpolymer as defined hereinafter. Trace amounts of impurities, such as catalyst residues, may be incorporated into or within a polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "propylene-based polymer," as used herein, refers to a polymer that comprises at least a majority weight percent polymerized propylene (based on the weight of polymer), and, optionally, one or more additional comonomers.

"Hydrocarbyl," and like terms, refer to a radical consisting of carbon and hydrogen atoms. Nonlimiting examples of hydrocarbyl radicals include alkyl (straight chain, branched or cyclic), aryl (e.g., phenyl, naphthyl, anthracenyl, biphenyl), aralkyl (e.g., benzyl), and the like.

"Substituted hydrocarbyl," and like terms, refer to a hydrocarbyl radical, in which one or more hydrogen atoms bound to any carbon of the hydrocarbyl radical, and/or one or more carbon atoms of the hydrocarbyl radical, is/are, independently, replaced by one of the following:
 i) a heteroatom, or
 ii) a group, comprising at least one heteroatom, and other than a peroxy group (—OOH).

Nonlimiting examples of heteroatoms include halogen, nitrogen, sulfur, oxygen. Nonlimiting examples of groups, other than a peroxy group, include haloalkyl, hydroxy, amino, phosphido, alkoxy, amino, thio, nitro, and combinations thereof.

"Aliphatic hydrocarbon" and like terms mean a branched or unbranched or cyclic, saturated or unsaturated, hydrocarbon radical. Nonlimiting examples of suitable aliphatic radicals include methyl, ethyl, n-propyl, i-propyl, 2-propenyl (or allyl), vinyl, n-butyl, t-butyl, i-butyl (or 2-methylpropyl), cyclopentyl, cyclohexyl, and the like. In one embodiment, the aliphatic radicals are alkyl radicals of 1 to 24 carbon atoms.

"Aryl" and like terms mean an aromatic radical which may be a single aromatic ring or multiple aromatic rings which are fused together, linked covalently, or linked to a common group such as a methylene or ethylene moiety. Nonlimiting examples of aromatic ring(s) include phenyl, naphthyl, anthracenyl, biphenyl, among others. In one embodiment, the aryl radicals typically comprise 6 to 20 carbon atoms.

Test Method

Melt Flow Rate: Also known as MFR (grams/10 minutes or dg/min) is measured in accordance with ASTM D 1238, Condition 230° C./2.16 kg.

High Temperature Gel Permeation Chromatography (GPC): The polymers are analyzed on a PL-220 series high temperature gel permeation chromatography (GPC) unit, equipped with a refractometer detector and four PLgel Mixed-A (20 μm) columns (Polymer Laboratory Inc.). The oven temperature is set at 150° C., and the temperatures of the autosampler's hot and the warm zones are set at 135° C. and 130° C., respectively. The solvent is nitrogen purged 1,2,4-trichlorobenzene (TCB), containing about 200 parts per million (ppm) 2,6-di-t-butyl-4-methylphenol (BHT). The flow rate is 1.0 mL/min, and the injection volume is 200 microliters (μl). A 2 milligram per liter (mg/mL) sample concentration is prepared by dissolving the sample in $N_2$ purged and preheated TCB (containing 200 ppm BHT), for 2.5 hours at 160° C., with gentle agitation.

The GPC column set is calibrated by running twenty narrow molecular weight distribution polystyrene standards. The molecular weight (Mw) of the standards ranges from 580 to 8,400,000 g/mol, and the standards are contained in six "cocktail" mixtures. Each standard mixture has at least a decade of separation between individual molecular weights. The polystyrene standards are prepared at "0.005 g in 20 mL" of solvent for molecular weights equal to, or greater than, 1,000,000 g/mol, and at "0.001 g in 20 mL" of solvent for molecular weights less than 1,000,000 g/mol. The polystyrene standards are dissolved at 150° C. for 30 minutes, under stirring. The narrow molecular weight distribution standards mixtures are run first, and in order of decreasing highest molecular weight component, to minimize the degradation effect. A logarithmic molecular weight calibration is generated, using a fourth-order polynomial fit as a function of elution volume. The equivalent polypropylene molecular weights are calculated by using the following equation, with reported Mark-Houwink coefficients for polypropylene (Th. G. Scholte, Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left( \frac{K_{PS} M_{PS}^{a_{PS}+1}}{K_{PP}} \right)^{\frac{1}{a_{PP}+1}}$$

where $M_{pp}$ is the polypropylene (PP) equivalent molecular weight (MW), $M_{PS}$ is the polystyrene (PS) equivalent MW, log K and a are values of the Mark-Houwink coefficients for PP and PS and are listed below:

| Polymer | a | log K |
|---|---|---|
| Polypropylene | 0.725 | −3.721 |
| Polystyrene | 0.702 | −3.900 |

The calculations of Mn, Mw and Mz based on GPC results, using the refractometer detector (dRI) and the narrow molecular weight distribution standards calibration, are determined from the following equations:

$$\overline{Mn} = \frac{\sum_i dRI_i}{\sum_i (dRI_i / M_{PP,i})}$$

$$\overline{Mw} = \frac{\sum_i (dRI_i * M_{PP,i})}{\sum_i dRI_i}$$

$$\overline{Mz} = \frac{\sum_i (dRI_i * M_{PP,i}^2)}{\sum_i (dRI_i * M_{PP,i})}$$

In the above equations, $dRI_i$ and $M_{PP,i}$ are the dRI baseline corrected response and conventional calibrated polypropylene molecular weight, respectively, for the $i^{th}$ slice of the dRI response.

Test Method for Tert-Butyl Alcohol Determination: The tert-butyl alcohol level in polypropylene is determine using headspace gas chromatography on an Agilent model 6890 gas chromatograph equipped with headspace sampler model 7694 with a flame ionization detector available from Agilent Technologies, Wilmington, Del. About one gram of polypropylene pellets (weighed and recorded to the nearest 0.0001 g) is placed into a headspace vial and sealed. The sample is equilibrated at 150° C. for one hour in the headspace vial. The headspace is analyzed and the peak area determined for tert-butyl alcohol. Quantitation is performed using an external standard calibration method with the previously determined distribution constant for tert-butyl alcohol in polypropylene at 150° C.

Differential Scanning Calorimetry (DSC): DSC is performed under a nitrogen headspace, from an initial temperature of 0° C. up to a final temperature of 400° C., at a scan rate of 10° C. per minute. The sample amount was about 10 mg.

Density: Samples for density measurements are prepared according to ASTM D 4703-10. Samples are pressed at 374° F. (190° C.), for five minutes, at 10,000 psi (68 MPa). The temperature is maintained at 374° F. (190° C.) for the above five minutes, and then the pressure is increased to 30,000 psi (207 MPa) for three minutes. This is followed by a one minute hold at 70° F. (21° C.) and 30,000 psi (207 MPa). Measurements are made within one hour of sample pressing using ASTM D792-08, Method B.

EXAMPLES

Experiments were run using a HAAKE mixer. DOW 5D98 is a polypropylene (first propylene-based polymer) having a melt flow rate (MFR) of 3.4 g/10 min and density of 0.900 g/cc (now available from Braskem). Table 1 provides the properties of various C—C initiators used in the examples.

TABLE 1

Properties of C-C Initiators

| Initiator | Name | Breaks into X radicals | Mw (g/mol) | DSC decomposition peak[a] (C.) | Equivalent radical (ppm) to 1000 ppm TRIGONOX 101[b] | 3 times equivalent radical (ppm) to 1000 pm TRIGONOX 101[b] |
|---|---|---|---|---|---|---|
| 3,4-diethyl-3,4-diphenyl hexane | DEDPH | 2 | 294.5 | 202.7 | 2,028 | 6,085 |
| 2,3-dimethyl-2,3-dipihenyl butane | DMDPB | 2 | 238.4 | 309.3 | 1,642 | NM |
| 3,4-dimethyl-3,4-diphenyl hexane | DMDPH | 2 | 266.4 | 277.5 | 1,835 | 5,504 |
| TRIGONOX 101 | Trig 101 | 4 | 290.4 | 183.5 | 1,000 | NM |
| 3,4-diisobutyl-3,4-diphenyl hexane | DBuDPH | 2 | 350.6 | 135 | 2,415 | NM |
| 3,4-dibenzyl-3,4-ditolyl hexane | DBnDTH | 2 | 448.6 | 130 | 3,090 | NM |

[a]DSC decomposition peak is the temperature at which decomposition occurs on the DSC scan, the scan may also show melting or crystallization peaks (see FIG. 1 for a typical DSC curve of DEDPH; decomposition temperature measured at the peak of the decomposition exotherm).
[b]Equivalent radicals is defined as the weight ppm required of each initiator to produce the same number of moles of radicals as 1000 weight ppm of TRIGONOX 101.
NM = not measured.

Preparation of Samples in RS5000 Torque Rheometer with HAAKE 600 Mixing Bowl:

Polymer samples were melt blended with various levels of specified additives in a heated RS5000 drive and HAAKE RHEOMIX 600 mixer. A 61% filling level of the mixing chamber was used, i.e., 61% of the volume of the chamber was filled with sample. The sample weight used was approximated as: The sample weight =bulk density of the material (0.900 g/cm$^3$)×net chamber volume (69 cm$^3$)×the filling fraction (0.61)~37.9 g.

The mixer was equipped with 25% GF (glass filled) TEFLON custom made bushings and roller style rotors. All of the materials (the polypropylene and the C-C initiators or peroxides) were added to the chamber, and then nitrogen purging was started during the melting and mixing of the materials. After the materials were added to the chamber, the nitrogen purge was started within 1-2 minutes. The nitrogen purge was at a low enough rate to not cause a significant temperature decrease of the melt or a "skin" on the melt surface of the sample in the nip between the rotors.

Molded capsules from the PP 5D98 were used for addition of additives into the heated mixer. The molded capsules were made with a custom made mold to mold the top and bottom of the capsule at 190° C. with no pressure in a manual PHI bench top press for about 5 minutes. The mold with the capsules was cooled to room temperature in air until cool enough to handle. The capsules were about 1-1.5 g in weight. This capsule weight was included in the weight of the sample's base polymer added to the mixer. The additive was then weighed into the capsule. This additive capsule was added into the mixer with the polymer pellets, using the ram to keep material in the mixer, until melted, about 40 seconds to one minute. Then the nitrogen block was put into the mixer opening to reduce atmospheric oxygen during the melt processing. See Table 2 for the polymer formulations.

The temperature was controlled in the bowl (Zone 2) using a melt thermocouple which touches the polymer (flush with the bowl surface). This thermocouple measures the polymer melt as it is processed. Zones 1 and 3 thermocouples were used to control the set temperature of these zones (the thermocouples in these cases are in the block but do not touch the polymer). The temperature of the polymer melt as set and measured by Zone 2 is shown in Table 2 (temperatures were either 210° C., 240° C., or 270° C.). The revolutions per minute (rpm) were 50, and the mixing time was 10 minutes for all samples.

Samples (about 38 g minus about 2 g which were unable to be easily removed from the chamber) were quickly removed from the hot mixer by scraping out with a stainless steel spatula onto TEFLON coated sheets, and immediately quench cooled, by pressing in a Carver hot press (the set point of the cooling fluid in the platens was 18° C., 3-5 minutes, 20,000 psi) the hot sample between the chilled platens of a CARVER hydraulic press to form a "pancake" of about ⅜-½ inches in thickness.

The visbreaking conditions are also summarized in Table 2, below.

Table 3 provides the melt flow rates of the examples described in Table 2, and Table 4 provides further molecular weight properties of the examples after visbreaking. Samples comprising TRIGONOX 101 are comparative samples.

TABLE 2

Polymer Formulations and Visbreaking Conditions

| Run # | Name | Initiator | Level of Initiator (ppm)* | Polymer Melt Temp. (° C.) |
|---|---|---|---|---|
| 1 | PP 5D98 | None | 0 | 210 |
| 2 | PP 5D98 + 1,000 ppm Trig 101 | Trig. 101 | 1,000 | 210 |
| 3 | PP 5D98 + 2.028 ppm DEDPH | DEDPH | 2,028 | 210 |
| 4 | PP 5D98 + 1,642 ppm DMDPB | DMDPB | 1,642 | 210 |
| 5 | PP 5D98 + 1,835 ppm DMDPH | DMDPH | 1,835 | 210 |
| 6 | PP 5D98 + 2,415 ppm DBuDPH | DBuDPH | 2,415 | 210 |
| 7 | PP 5D98 + 3,090 ppm DBuDPH | DBnDTH | 3,090 | 210 |
| 8 | PP 5D98 | None | 0 | 240 |
| 9 | PP 5D98 + 1,000 ppm Trig 101 | Trig. 101 | 1,000 | 240 |
| 10 | PP 5D98 + 2,028 ppm DEDPH | DEDPH | 2,028 | 240 |
| 11 | PP 5D98 + 1,642 ppm DMDPB | DMDPB | 1,642 | 240 |
| 12 | PP 5D98 + 1,835 ppm DMDPH | DMDPH | 1,835 | 240 |
| 13 | PP 5D98 + 2,415 ppm DBuDPH | DBuDPH | 2,415 | 240 |
| 14 | PP 5D98 + 3,090 ppm DBuDPH | DBnDTH | 3,090 | 240 |
| 15 | PP 5D98 | None | 0 | 270 |
| 16 | PP 5D98 + 1,000 ppm Trig 101 | Trig. 101 | 1,000 | 270 |
| 17 | PP 5D98 + 1,642 ppm DMDPB | DMDPB | 1,642 | 270 |

*The ppm amount based on weight of first propylene-based polymer.

TABLE 3

Melt Flow Rate at 230° C.; 2.16 kg, after visbreaking (units: g/10 min)

| Melt Temp. (° C.) | PP 5D98 | PP 5D98 + 1,000 ppm Trig 101 | PP 5D98 + 2,028 ppm DEDPH | PP 5D98 + 6,085 ppm DEDPH | PP 5D98 + 1,642 ppm DMDPB | PP 5D98 + 1,835 ppm DMDPH | PP 5D98 + 2,415 ppm DBuDPH | PP 5D98 + 3,090 ppm DBnDTH |
|---|---|---|---|---|---|---|---|---|
| 210 | 4.4 | 65.3 | 13.4 | 19.3 | 7.4 | 9.6 | 9.7 | 10.4 |
| 240 | 9.0 | 138.9 | 26.7 | 28.2 | 15.0 | 23.3 | 18.1 | 12.1 |
| 270 | 32.5 | 118.9 | Sample not made | 73.8 | 58.8 | 85.8 | Sample not made | Sample not made |

TABLE 4

GPC Moments after Visbreaking

| Sample | Mn (g/mol) | Mw (g/mol) | Mz (g/mol) | Mw/Mn |
|---|---|---|---|---|
| PP 5D98 | 63,495 | 360,175 | 1,273,486 | 5.67 |
| PP 5D98 (210 C.) | 62,169 | 347,267 | 1,155,680 | 5.59 |
| PP 5D98 (240 C.) | 61,567 | 302,002 | 892,828 | 4.91 |
| PP 5D98 (270 C.) | 27,933 | 131,627 | 324,007 | 4.71 |
| PP 5D98 + 1,000 ppm Trig 101 (210 C.) | 43,643 | 140,810 | 295,319 | 3.23 |
| PP 5D98 + 1,000 ppm Trig 101 (240 C) | 40,829 | 128,480 | 259,375 | 3.15 |
| PP 5D98 + 1,000 ppm Trig 101 (270 C.) | 24,196 | 84,745 | 186,242 | 3.50 |
| PP 5D98 + 3,090 ppm DBuDPH (210 C.) | 57,514 | 259,282 | 673,274 | 4.51 |
| PP 5D98 + 3,090 ppm DBuDPH (240 C.) | 35,790 | 159,046 | 403,303 | 4.44 |
| PP 5D98 + 1,642 ppm DMDPB (210 C.) | 59,264 | 309,407 | 915,222 | 5.22 |
| PP 5D98 + 1,642 ppm DMDPB (240 C.) | 37,317 | 159,063 | 404,183 | 4.26 |
| PP 5D98 + 1,642 ppm DMDPB (270 C.) | 19,629 | 100,674 | 230,088 | 5.13 |
| PP 5D98 + 2,415 ppm DBuDPH (210 C.) | 57,105 | 262,076 | 682,372 | 4.59 |
| PP 5D98 + 2,415 ppm DBuDPH (240 C.) | 31,383 | 132,084 | 315,032 | 4.21 |
| PP 5D98 + 2,028 ppm DEDPH (210 C.) | 56,282 | 247,960 | 628,099 | 4.41 |
| PP 5D98 + 2,028 ppm DEDPH (240 C.) | 49,811 | 202,198 | 466,238 | 4.06 |
| PP 5D98 + 6,085 ppm DEDPH (210 C.) | 53,033 | 220,690 | 539,271 | 4.16 |
| PP 5D98 + 6,085 ppm DEDPH (240 C.) | 48,783 | 193,574 | 445,976 | 3.97 |
| PP 5D98 + 6,085 ppm DEDPH (270 C.) | 36,753 | 148,761 | 328,950 | 4.05 |
| PP 5D98 + 1,835 ppm DMDPH (210 C.) | 59,530 | 271,958 | 723,204 | 4.57 |
| PP 5D98 + 1,835 ppm DMDPH (240 C.) | 33,330 | 133,681 | 322,289 | 4.01 |
| PP 5D98 + 1 835 ppm DMDPH (270 C.) | 40,757 | 152,192 | 339,047 | 3.73 |

As shown in Table 3, the melt flow rate of the second propylene-based polymer increases after visbreaking, with DEDPH and DMDPH (C—C initiators), showing the most significant increase, with final melt flow rates (at 270° C.) very similar to those obtained with TRIGONOX 101. Table 3 also shows that some C-C initiators (such as DEDPH and DMDPB) are more effective at higher temperatures, while others (such as DBnDTH) are more effective at lower temperatures. As shown in Table 4, the Mw/Mn values of the inventive examples using C-C initiators are generally greater than that of the comparative examples using TRIGONOX 101.

Table 5 demonstrates the level of tert-butanol, a known odor-causing compound measured in these polymer samples. The polymer from the comparative example made with TRIGONOX 101 shows a t-butanol level greater than 1 ppm, whereas the polymer samples made with the new initiators, in most cases, show non-detectable or very low levels.

TABLE 5

Tert-Butanol values after Visbreaking

| | Units | PP 5D98 + 6,085 ppm DEDPH (270° C.) | PP 5D98 + 1835 ppm DMDPH (270° C.) | PP 5D98 | PP 5D98 (270° C.) | PP 5D98 + 1,000 ppm Trig 101 (270° C.) | PP 5D98 + 1,642 ppm DMDPB (270° C.) |
|---|---|---|---|---|---|---|---|
| Average tert-butanol | ppm* | 0.339 | ND | ND | ND | 1.042 | ND |

ND = Not Detected

*ppm level based on the weight of the second propylene-based polymer sample.

As shown in Tables 3-5, the second propylene-based polymers prepared from the inventive processes have excellent properties in terms of melt flow rates, MWD (Mw/Mn) values, and reduced by-products (for example, tert-butanol).

What is claimed is:

1. A process to prepare a second propylene-based polymer from a first propylene-based polymer, each propylene-based polymer having a melt flow rate (MFR; 2.16kg/230° C.) with the MFR of the second propylene-based polymer greater than the MFR of the first propylene-based polymer, the process comprising the step of contacting under visbreaking conditions in the absence of oxygen and in the absence of oxygen-containing compounds the first propylene-based polymer with at least one carbon-carbon (C-C) free-radical initiator of Structure I:

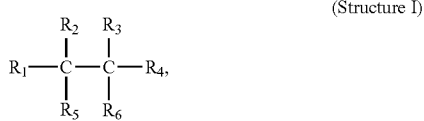

(Structure I)

wherein $R_1$, $R_2$, $R_3$, $R_4$, $R_5$ and $R_6$ are each, independently, a $C_1$-$C_{12}$ hydrocarbyl group.

2. The process of claim 1, wherein $R_1$, $R_2$, $R_3$, $R_4$, $R_5$ and $R_6$ are each, independently, a $C_1$-$C_8$ hydrocarbyl group.

3. The process of claim 1 comprising contacting the first propylene-based polymer with from 0.05 wt % to 0.5 wt % C-C free-radical initiator, based on the weight of the first propylene-based polymer.

4. The process of claim 1, wherein the C-C free-radical initiator has a decomposition temperature of greater than 130° C. based on DSC measurements.

5. The process of claim 1, comprising contacting the first propylene-based polymer with at least two different C-C free-radical initiators.

6. The process of claim 1, wherein $R_1$ and $R_4$ are each a phenyl group.

7. The process of claim 1, wherein the at least one C-C free radical initiator is 3,4-diethyl-3,4-diphenyl hexane.

8. The process of claim 1, wherein the MFR of the second propylene-based polymer is at least 130% of the MFR of the first propylene based polymer.

9. The process of claim 1, wherein the visbreaking conditions further include contacting the first propylene-based polymer with the C-C free radical initiator under an inert atmosphere.

10. The process of claim 1, wherein the first propylene-based polymer has a density from 0.83 g/cc to 0.90 g/cc.

11. The process of claim 10, wherein the first propylene-based polymer has a molecular weight distribution from 3 to 5.

12. The process of claim 1, wherein the visbreaking conditions further include activating the C-C free radical initiator by radiation.

13. The process of claim 1 wherein the visbreaking conditions further include contacting the first propylene-based polymer with the C-C free radical initiator at a temperature from 200° C. to 350° C.

14. The process of claim 1, wherein the at least one C-C free radical initiator is selected from the group consisting of 2,3-dimethyl-2,3-diphenyl butane, 3,4-diethyl-3,4-diphenyl hexane, 3,4-diisobutyl-3,4-diphenyl hexane, 3,4-dibenzyl-3,4-ditolyl hexane, 2,7-dimethyl-4,5-diethyl-4,5-diphenyl octane, 3,4-diethyl-3,4-di(dimethylphenyl) hexane, 3,4-dibenzyl-3,4-diphenyl hexane, poly-1,4-diisopropyl benzene, and combinations thereof.

* * * * *